US012309169B2

(12) United States Patent
Gould et al.

(10) Patent No.: US 12,309,169 B2
(45) Date of Patent: May 20, 2025

(54) ACCESSING DATA ON A BLOCKCHAIN WITH PROOF OF DATA VERIFICATION

(71) Applicant: Unstoppable Domains, Inc., Las Vegas, NV (US)

(72) Inventors: Matthew Gould, Reno, NV (US); Braden River Pezeshki, Reno, NV (US); Lisa Seacat DeLuca, Bozeman, MT (US)

(73) Assignee: Unstoppable Domains, Inc., Las Vegas, NV (US)

( * ) Notice: Subject to any disclaimer, the term of this patent is extended or adjusted under 35 U.S.C. 154(b) by 227 days.

(21) Appl. No.: 17/850,272

(22) Filed: Jun. 27, 2022

(65) Prior Publication Data

US 2023/0421570 A1    Dec. 28, 2023

(51) Int. Cl.
*H04L 9/40*    (2022.01)

(52) U.S. Cl.
CPC .......... *H04L 63/123* (2013.01); *H04L 63/045* (2013.01)

(58) Field of Classification Search
CPC ........ H04L 63/123; H04L 63/045; H04L 9/50
See application file for complete search history.

(56) References Cited

U.S. PATENT DOCUMENTS

| | | | | |
|---|---|---|---|---|
| 10,123,202 | B1 * | 11/2018 | Polehn | H04B 1/3816 |
| 10,708,042 | B1 * | 7/2020 | Rubenstein | H04L 9/0643 |
| 10,826,685 | B1 * | 11/2020 | Campagna | H04L 9/3247 |
| 2016/0241628 | A1 * | 8/2016 | Seren | H04L 61/5007 |
| 2019/0165930 | A1 * | 5/2019 | Castinado | H04L 9/3239 |

(Continued)

FOREIGN PATENT DOCUMENTS

CN    113221166 A  *  8/2021  ............. G06F 21/44

OTHER PUBLICATIONS

Chiliveri, Sireesha, et al. "ProveDoc: A blockchain based proof of existence with proof of storage." 2019 International Conference on Information Technology (ICIT). IEEE, 2019. (Year: 2019).*

(Continued)

*Primary Examiner* — Jung W Kim
*Assistant Examiner* — Sameera Wickramasuriya
(74) *Attorney, Agent, or Firm* — Edell, Shapiro & Finnan, LLC

(57) ABSTRACT

According to a present invention embodiment, a system for accessing data on a blockchain comprises one or more memories and at least one processor coupled to the one or more memories. The system accesses one or more data sources to retrieve one or more data elements satisfying a data request from an entity. The one or more data elements include at least one blockchain data element retrieved from a corresponding blockchain. Verification information is produced for each blockchain data element that is used to validate the blockchain data element against values derived from data of a block of the corresponding blockchain containing the blockchain data element. The one or more data elements and the verification information for each blockchain data element are sent to the entity. Present invention embodiments further include a method and computer program product for accessing data on a blockchain in substantially the same manner described above.

18 Claims, 7 Drawing Sheets

(56) References Cited

U.S. PATENT DOCUMENTS

| | | | | |
|---|---|---|---|---|
| 2020/0043007 | A1* | 2/2020 | Simons | H04L 9/3236 |
| 2020/0097862 | A1* | 3/2020 | Arora | H04W 12/108 |
| 2020/0313867 | A1* | 10/2020 | Yu | H04L 9/088 |
| 2020/0351075 | A1* | 11/2020 | Griffin | H04N 21/23109 |
| 2021/0297265 | A1* | 9/2021 | Huang | G06F 16/2379 |
| 2021/0304191 | A1* | 9/2021 | O'Grady | G06F 9/541 |
| 2022/0147988 | A1 | 5/2022 | Alexa et al. | |

OTHER PUBLICATIONS

Y. Hu et al., "A Delay-Tolerant Payment Scheme Based on the Ethereum Blockchain," in IEEE Access, vol. 7, pp. 33159-33172, 2019 (Year: 2019).*

Jake Frankenfield, "Merkle Root (Cryptocurrency)", https://www.investopedia.com/terms/m/merkle-root-cryptocurrency.asp#:~:text=A%20Merkle%20root%20is%20a,whole%2C%20undamaged%2C%20and%20unaltered, Investopedia, Aug. 24, 2021, 7 pages.

"Merkle Tree & Merkle Root Explained", Nov. 29, 2017, https://www.mycryptopedia.com/merkle-tree-merkle-root-explained/, 3 pages.

"Calculating the Merkle Root for a block", https://bitcoindev.network/calculating-the-merkle-root-for-a-block/, downloaded from the internet on Jun. 24, 2022, 15 pages.

Wikipedia, "Blockchain", https://en.wikipedia.org/wiki/Blockchain, downloaded from the internet on Mar. 25, 2022, 27 pages.

"How does a transaction get into the blockchain?", Euromoney Learning, https://www.euromoney.com/learning/blockchain-explained/how-transactions-get-into-the-blockchain, downloaded from the internet on Mar. 25, 2022, 9 pages.

Benjamin Powers, "Brave Integrates Crypto Blockchain Domains, Expanding Access to Web 3.0—CoinDesk", https://www.coindesk.com/tech/2021/05/13/brave-integrates-crypto-blockchain-domains-expanding-access-to-web-30/, May 13, 2021, 10 pages.

Michele D'Aliessi, "How Does the Blockchain Work? A Guide to Everything You Need to Know", OneZero, https://onezero.medium.com/how-does-the-blockchain-work-98c8cd01d2ae, Jun. 1, 2016, 21 pages.

Blog, "Introducing Humanity Check—100% Opt-In", Unstoppable Domains, https://unstoppabledomains.com/blog/introducing-humanity-check, Mar. 13, 2022, downloaded from the internet on Mar. 25, 2022, 8 pages.

Amaury Martiny, "One-click Login with Blockchain: A MetaMask Tutorial", https://www.toptal.com/ethereum/one-click-login-flows-a-metamask-tutorial, downloaded from the internet on Mar. 25, 2022, 16 pages.

"What is a non-fungible token (NFT)?", https://www.coinbase.com/learn/crypto-basics/plp-what-is-nft, downloaded from the internet on Mar. 25, 2022, 10 pages.

"Why Are Some Domains Protected?", Unstoppable Domains, Mar. 11, 2022, https://support.unstoppabledomains.com/support/solutions/articles/48001186091-why-are-some-domains-protected, 3 pages.

"Humanity Check Overview", https://docs.unstoppabledomains.com/login-with-unstoppable/humanity-check/humanity-check-for-login/, downloaded from the internet on Apr. 7, 2022, 5 pages.

Chris Hexton, "What is a webhook: How they work and how to set them up", https://www.getvero.com/resources/webhooks/, downloaded from the internet on May 12, 2022, 18 pages.

"Blocks", https://ethereum.org/en/developers/docs/blocks/#block-anatomy, Jan. 3, 2022, 6 pages.

"Ethereum Name Service (ENS)", https://www.coingecko.com/en/coins/ethereum-name-service, retrieved from the Internet Oct. 30, 2023, 11 pages.

"Decentralised naming for wallets, websites, & more", https://ens.domains/, retrieved from the Internet Oct. 30, 2023, 8 pages.

* cited by examiner

FIG. 7

```
{
  records: {
    "address": {
      "value": "0x8aaD44321A86b170879d7A244cle8d360c99DdA8",
      "proof": {/* Proof */}
    }
  },
  "meta": {
    "chainId": 1,
    "blockchain": "bc1",
    "blockNumber": 1,
    "blockHash":
"0x1234567879012345678901234567890123456789012345678901234",
    "block": {/* Block including the stateRoot */},
    "owner": {
      "value": "0x1234567890123456789012345678901234567890",
      "proof": {/* Proof */}
    },
  }
}
```

ACCESSING DATA ON A BLOCKCHAIN WITH PROOF OF DATA VERIFICATION

BACKGROUND

1. Technical Field

Present invention embodiments relate to data access from a blockchain, and more specifically, to accessing data from a blockchain and providing proof for verification of the accessed data.

2. Discussion of the Related Art

Various companies are reading and writing data on a blockchain, and have created their own application programming interfaces (APIs) to share the data. Although merely trusting a value from the blockchain returned from an API may be performed on the order of milliseconds, liability may arise for financial related transactions performed with corrupted data. Further, generating a proof to verify a value from the blockchain returned from an API can be time consuming and endure for as long as a few minutes, thereby significantly increasing consumption of computing resources and processing time for performing transactions or other operations with verified data.

SUMMARY

According to one embodiment of the present invention, a system for accessing data on a blockchain comprises one or more memories and at least one processor coupled to the one or more memories. The system accesses one or more data sources to retrieve one or more data elements satisfying a data request from an entity. The one or more data elements include at least one blockchain data element retrieved from a corresponding blockchain. Verification information is produced for each blockchain data element that is used to validate the blockchain data element against values derived from data of a block of the corresponding blockchain containing the blockchain data element. The one or more data elements and the verification information for each blockchain data element are sent to the entity. Embodiments of the present invention further include a method and computer program product (e.g., including one or more computer readable media with instructions executable by one or more processors) for accessing data on a blockchain in substantially the same manner described above.

BRIEF DESCRIPTION OF THE DRAWINGS

Generally, like reference numerals in the various figures are utilized to designate like components.

FIG. 7 is an example result for a data request modified with blockchain attributes for blockchain data according to an embodiment of the present invention.

DETAILED DESCRIPTION

An embodiment of the present invention ensures trustworthiness of results from blockchain-based application programming interfaces (APIs). This is accomplished through inclusion in a result from an API of relevant blockchain attributes when a blockchain data element or value (e.g., a data element or value obtained from a blockchain) is present in the result. The blockchain attributes may include a verification proof (e.g., Merkle proof, etc.) for the blockchain value in the result. The verification proof and other blockchain attributes may be used to validate blockchain data in the result at a future point in time. For example, a result may include a wallet address obtained from a blockchain. The verification proof provided in the result may validate the wallet address and reduce liability for any changes to the wallet address since initiation of a transaction.

Liability may arise for financial related or other transactions performed with corrupted data. However, generating a proof to verify a value from the blockchain returned from an application programming interface (API) can be time consuming and endure for as long as a few minutes, whereas merely trusting a value from the blockchain returned from the API may be performed on the order of milliseconds. Accordingly, an embodiment of the present invention associates blockchain data (e.g., data obtained from a blockchain) within a result from an API with blockchain specific verification attributes. This enables the value for blockchain data returned from the API to be trusted while reducing liability for any financial related or other transactions. In addition, this approach guarantees that values can be verified at a future date/time. Thus, data consumers may use results with blockchain data immediately with an option to validate the blockchain data of the results at a future date/time, thereby maintaining fast service level agreements (SLAs) for response time. In other words, data consumers may request a proof of verification of the blockchain data to perform the verification and/or results of a verification performed for the blockchain data.

Figure 1:
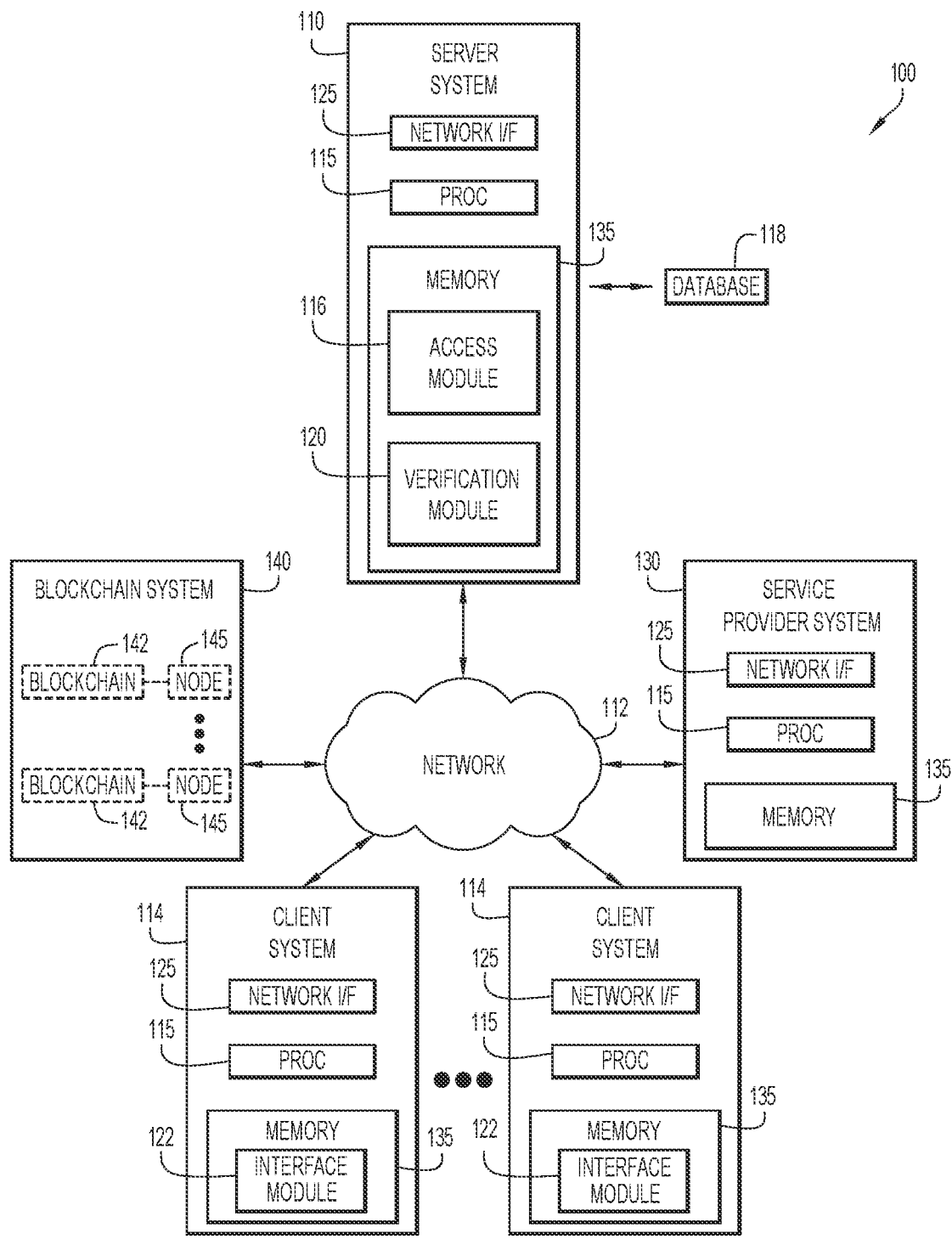
FIG. 1 is a diagrammatic illustration of an example computing environment according to an embodiment of the present invention.

An example environment 100 for use with present invention embodiments is illustrated in FIG. 1. Specifically, environment 100 includes one or more server systems 110, one or more client or end-user systems 114, one or more service provider systems 130, and one or more blockchain systems 140 each implementing and maintaining a corresponding blockchain 142. Server systems 110, client systems 114, service provider systems 130, and/or blockchain systems 140 may be remote from each other and communicate over a network 112. The network may be implemented by any number of any suitable communications media (e.g., wide area network (WAN), local area network (LAN), Internet, Intranet, etc.). Alternatively, server systems 110, client systems 114, service provider systems 130, and/or blockchain systems 140 may be local to each other, and communicate via any appropriate local communication medium (e.g., local area network (LAN), hardwire, wireless link, Intranet, etc.).

Client systems 114 may include an interface module 122 to enable users to submit requests to server systems 110 for data from various data sources (e.g., blockchains 142, database systems, decentralized storage platforms, etc.). The interface module may include any conventional or other browser. The server systems include an access module 116 and a verification module 120. The access module interfaces with a user via client system 114 to process requests for data from various data sources. The access module may further process requests for data from other entities (e.g., application, service, etc.). Verification module 120 provides proof of verification and/or verifies data values retrieved from a blockchain. The access module and verification module may form an application programming interface (API) that processes data requests and provides a result in the form of a payload with the requested data. The API may receive any quantity of any parameters to provide requested data (e.g., data location and/or source, search criteria, etc.). Server systems 110 may further provide implementation and management of blockchains (e.g., blockchains 142, etc.). The service provider systems 130 may include any third party or other server systems implementing or providing blockchains (e.g., blockchains 142, etc.), various social media or other network sites, and/or other services (e.g., blockchain management, domain registry management, user accounts of network sites, blockchain data verification, etc.).

A database system 118 may store various information for the data request (e.g., responses to the data requests, verification proofs, blockchain attributes, etc.). The database system may be implemented by any conventional or other database or storage unit, may be local to or remote from server systems 110, client systems 114, service provider systems 130, and/or blockchain systems 140, and may communicate via any appropriate communication medium (e.g., local area network (LAN), wide area network (WAN), Internet, hardwire, wireless link, Intranet, etc.). The client systems 114 may present a graphical user (e.g., GUI, etc.) or other interface (e.g., command line prompts, menu screens, etc.) to interact with users pertaining to the desired data request, and may provide reports or notifications pertaining to the data request (e.g., results of the data request, verification proof, verification results, blockchain attributes, etc.).

Blockchain systems 140 may include one or more nodes 145 to implement and maintain a corresponding blockchain 142. The nodes may be implemented by server systems 110, service provider systems 130, and/or other computing devices (e.g., as described below for FIG. 2). The blockchain is generally in the form of a ledger that includes a series of records or blocks chained or linked together. The blockchain is typically managed by a peer-to-peer network (of nodes 145) and used as a distributed ledger. Nodes 145 of the peer-to-peer network communicate and verify new blocks according to a protocol. The peer-to-peer network provides a de-centralized approach, where each node has a copy of blockchain 142. Transactions are transmitted to the peer-to-peer network, where mining nodes (nodes 145) process the transactions. The mining nodes validate a transaction, insert the transaction into a current block, and transmit the block to the other nodes. Blockchain 142 may be implemented by any conventional or other blockchain, and may be a public (e.g., no access restrictions, etc.), private (e.g., restricted access, etc.), or hybrid (e.g., with centralized and de-centralized features) blockchain.

Server systems 110 and client systems 114 may be implemented by any conventional or other computer systems preferably equipped with a display or monitor, a base, optional input devices (e.g., a keyboard, mouse or other input device), and any software for use by present invention embodiments (e.g., server/communications software, blockchain software, access module 116, verification module 120, interface module 122, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.)).

Service provider systems 130 may be implemented by any conventional or other computer systems preferably equipped with a display or monitor, a base, optional input devices (e.g., a keyboard, mouse or other input device), and any commercially available or custom software (e.g., server/communications software, social media or other network site software, service software, blockchain software, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.).

Access module 116, verification module 120, and interface module 122 may include one or more modules or units to perform the various functions of present invention embodiments described below. The various modules (e.g., access module 116, verification module 120, interface module 122, etc.) may be implemented by any combination of any quantity of software and/or hardware modules or units, and may reside within memory 135 of the server and/or client systems for execution by a corresponding processor 115.

Figure 2:
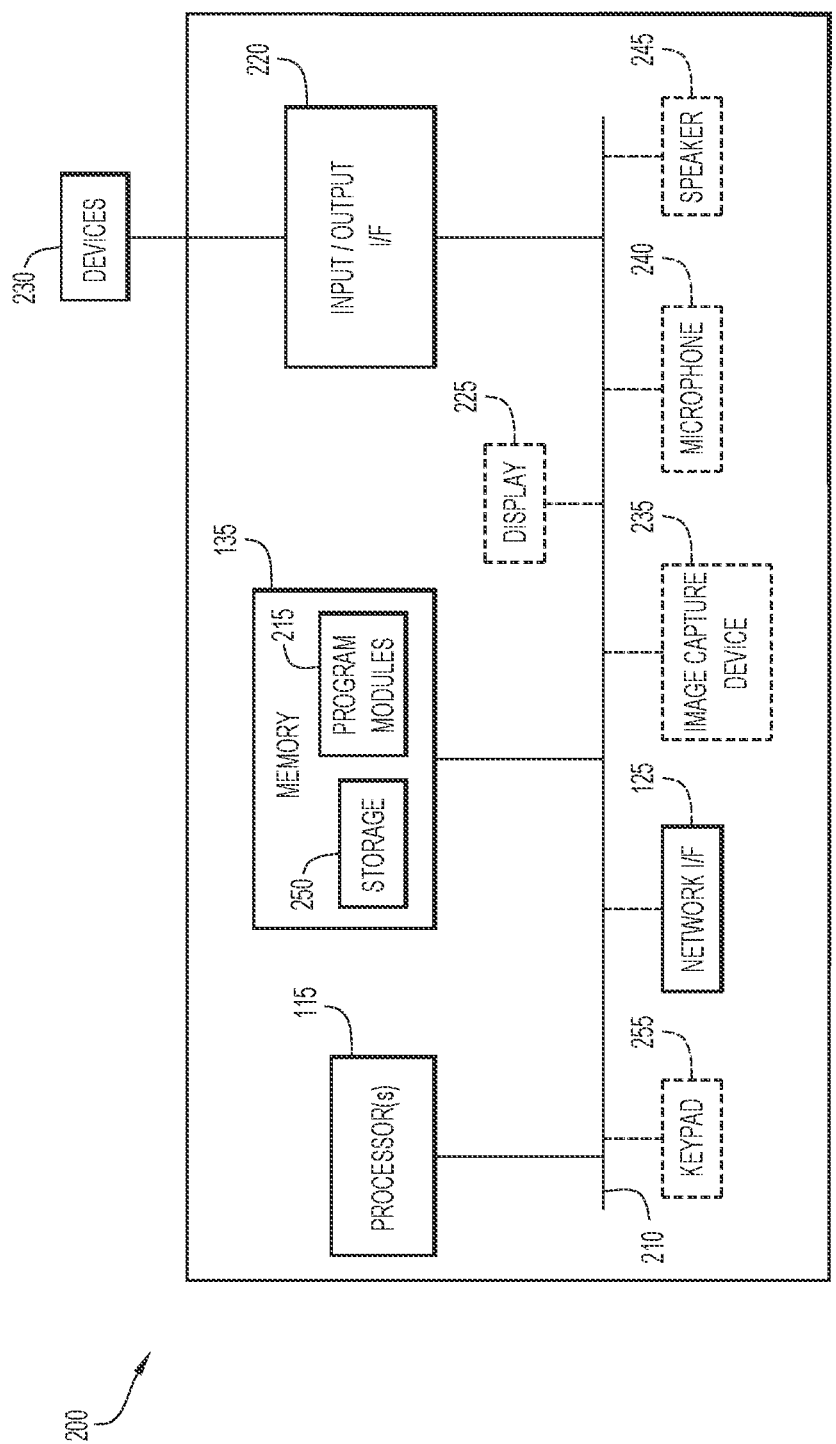
FIG. 2 is a block diagram of an example computing device according to an embodiment of the present invention.

An example of a computing device 200 of environment 100 (e.g., implementing server systems 110, client systems 114, service provider systems 130, blockchain systems 140, nodes 145, etc.) is illustrated in FIG. 2. The example computing device may perform the functions of present invention embodiments described herein. Computing device 200 may be implemented by any personal or other type of computer or processing system (e.g., desktop, laptop, handheld device, smartphone or other mobile device, etc.), and may be used for any computing environments (e.g., cloud computing, client-server, network computing, mainframe, stand-alone systems, etc.).

Computing device 200 may include one or more processors 115 (e.g., microprocessor, controller, central processing unit (CPU), etc.), network interface 125, memory 135, a bus 210, and an Input/Output interface 220. Bus 210 couples these components for communication, and may be of any type of bus structure, including a memory bus or memory controller, a peripheral bus, and a processor or local bus using any of a variety of conventional or other bus architectures. Memory 135 is coupled to bus 210 and typically includes computer readable media including volatile media (e.g., random access memory (RAM), cache memory, etc.), non-volatile media, removable media, and/or non-removable media. For example, memory 135 may include storage 250 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 210 via one or more data interfaces.

Moreover, memory 135 includes a set of program modules 215 (e.g., corresponding to access module 116, verification module 120, interface module 122, blockchain software, network site or service software, etc.) that are configured to perform functions of present invention embodiments described herein. The memory may further include an operating system, at least one application and/or other modules, and corresponding data. These may provide an implementation of a networking environment.

Input/Output interface 220 is coupled to bus 210 and communicates with one or more peripheral or external devices 230 (e.g., a keyboard, mouse or other pointing device, a display, biometric sensing devices, etc.), at least one device that enables a user to interact with computing device 200, and/or any device (e.g., network card, modem, etc.) that enables computing device 200 to communicate with one or more other computing devices. Computing device 200 may communicate with one or more networks (e.g., a local area network (LAN), a wide area network (WAN), a public network (e.g., the Internet), etc.) via network interface 125 coupled to bus 210.

With respect to certain entities (e.g., client system 114, etc.), computing device 200 may further include, or be coupled to, a touch screen or other display 225, a camera or image capture device 235, a microphone or other sound sensing device 240, a speaker 245 to convey sound, and/or a keypad or keyboard 255 to enter information (e.g., alphanumeric information, etc.). These items may be coupled to bus 210 or Input/Output interface 220 to transfer data with other elements of computing device 200.

Initially, a blockchain (e.g., blockchain 142, etc.) is generally in the form of a ledger that includes a series of records or blocks chained or linked together. Each block includes a hash of the prior block in the blockchain, a timestamp, and transaction information. The hash of the prior block enables the blockchain to be resistant to modification since changes to data in any prior block alter the hash value which propagates to subsequent blocks.

A blockchain is typically managed by a peer-to-peer network and used as a distributed ledger. Nodes of the peer-to-peer network communicate and verify new blocks according to a protocol. The peer-to-peer network provides a de-centralized approach, where each node has a copy of the blockchain. Transactions are transmitted to the network, where mining nodes process the transactions. The mining nodes validate a transaction, insert the transaction into a current block, and transmit the block to the other nodes. Various consensus approaches may be used for combining validation results of different mining nodes to determine validity of a transaction (or block).

Users of transactions for the blockchain are authenticated based on cryptographic keys. These keys identify a user and provide access to a user account or wallet. The user wallet is basically an application or software that enables users to store and access digital assets (e.g., for receiving or sending cryptocurrency or other fungible tokens, non-fungible tokens (NFTs), etc.). For example, a non-fungible token (NFT) is a crypto type asset with each token being unique (and representing items, such as digital art, music, or video game items), whereas fungible tokens (e.g., coins of the same cryptocurrency) have the same value of worth and are exchangeable. Each user is associated with their own private key (e.g., accessible only to the associated user, etc.) and a public key (e.g., typically an address on the blockchain). The private and public keys enable authentication of the user based on digital signatures in order to commence a transaction. The user account or wallet typically stores the private key.

For example, in order for the user to send cryptocurrency, a message for a transaction is encrypted with the private key of the user wallet. The private key enables only the user to control the user wallet. A digital signature is created by encrypting the message with the private key, where the digital signature is used to verify the user and transaction. The message may be decrypted with the corresponding public key of the user wallet. Since the private key is unique to the user, successful decryption of the message with the corresponding public key verifies the message was sent by the user. Once verified, the transaction may be posted to the blockchain, thereby adjusting the user wallet based on the transaction.

In addition, a blockchain may store software (e.g., typically referred to as smart contracts) that executes in response to occurrence of pre-defined conditions. A smart contract is generally software or a program that runs on the blockchain. The code and data for the smart contract reside at a specific address on the blockchain. Non-fungible tokens (NFTs) are controlled by smart contracts that handle transference and verification of ownership of the non-fungible tokens (NFTs). A blockchain may be public (e.g., no access restrictions, etc.), private (e.g., restricted access, etc.), or hybrid (e.g., with centralized and de-centralized features).

A blockchain domain name is stored on a blockchain. The blockchain domain name may be a non-fungible token (NFT) domain name that is associated with a non-fungible token (NFT) stored in a user wallet. The blockchain domain name may be associated with various information (e.g., wallet addresses, user information (e.g., name, address, email, etc.), data or other access restrictions, etc.). The blockchain domain name is associated with software or smart contracts on the blockchain that may perform various functions (e.g., provide a registry for corresponding wallet addresses, indicate locations of content for the domain (e.g., or a website, etc.) hosted on the blockchain or other system, etc.). In order to access a blockchain domain, the blockchain is accessed to find the record corresponding to the blockchain domain name (which may initiate the corresponding smart contracts for the corresponding functionality). The private key of the user wallet enables the user to have sole control of the blockchain domain name (e.g., authenticating operations or transactions for the blockchain domain name similar to the cryptocurrency example described above, etc.). For example, the user may have sole control to perform operations that alter content and/or functionality for the blockchain domain name.

Figure 3:
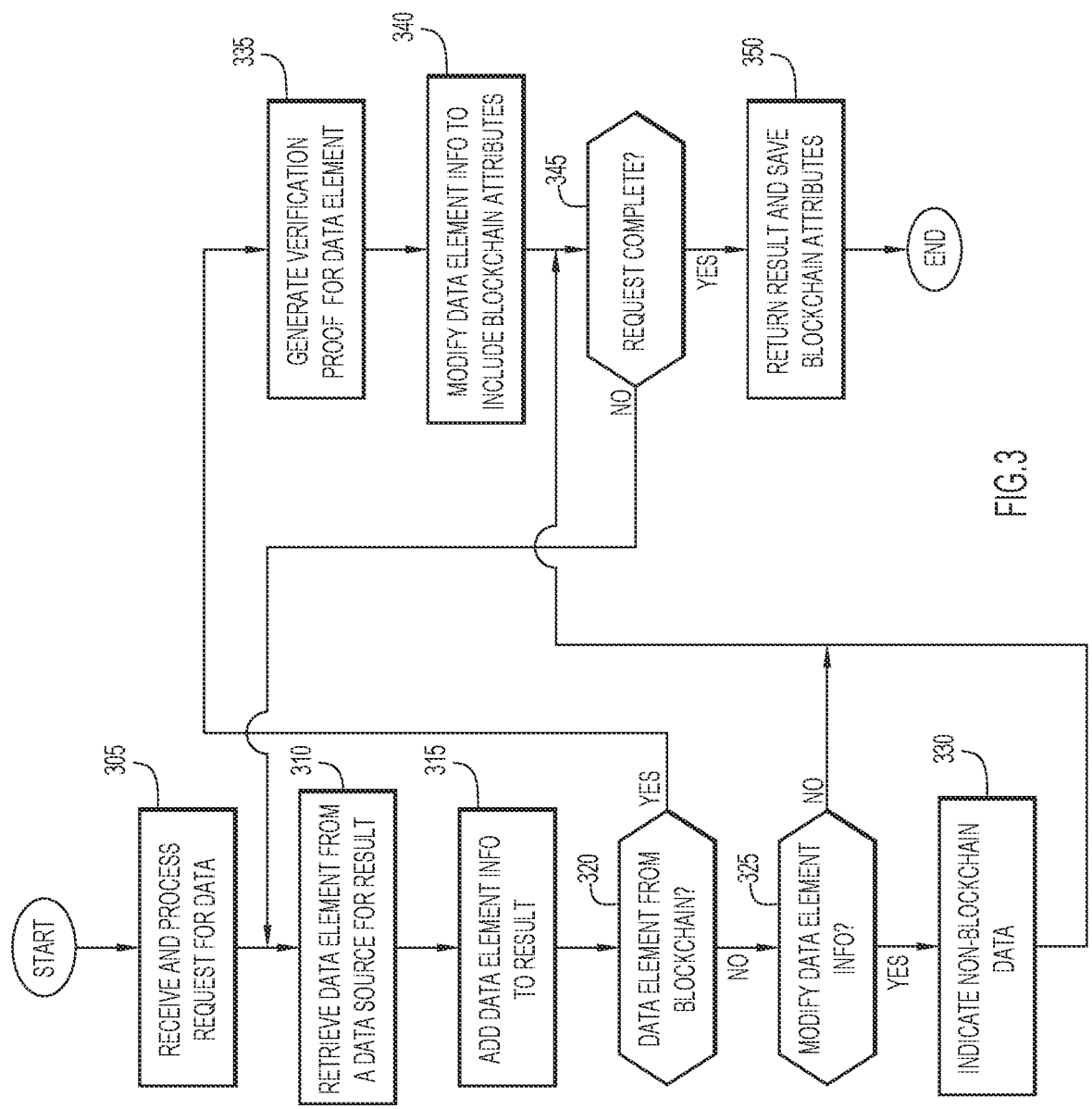
FIG. 3 is a flowchart of a method of accessing data with proof for verification of blockchain data according to an embodiment of the present invention.

A method of accessing data with proof for verification of blockchain data (e.g., via access module 116, verification module 120, blockchain system 140, and server system 110 and/or client system 114) according to an embodiment of the present invention is illustrated in FIG. 3. Initially, a request for data is received and processed by access module 116 of server system 110 at operation 305. The request may be from a user of client system 114, an application, or a network or other service (e.g., service provider system 130, etc.). The request includes a query or other indication of desired data to retrieve (e.g., search criteria, attributes, etc.), and may indicate data sources containing the requested data (e.g., particular blockchain, off-chain or other database, network or other site or service, etc.). The request may identify a block of a blockchain to retrieve data (e.g., a block number or hash value of a block of a blockchain when interested in a state of the blockchain that is not the latest or most recent state). In other words, the request may indicate a state of the blockchain for a previous point in time for retrieving data (e.g., based on the block number or hash value of a block, etc.). For example, the request may be in the form of a call (with corresponding parameters for data retrieval) to an application programing interface (API) containing access module 116 and verification module 120.

The request is processed by access module 116, and a data element satisfying the request is retrieved from a corresponding data source at operation 310. The data source may include blockchain 142, a database, a network site, and/or any other available data source. For example, the request may indicate retrieval of a crypto or wallet address, email address, and an non-fungible token (NFT) collection. The crypto or wallet address and NFT collection may reside on a blockchain 142 of a blockchain system 140, while the email address may reside on an off-chain database. Access module 116 may access blockchain 142 (via blockchain system 140) to retrieve the wallet or crypto address and NFT collection, and further access the off-chain database to retrieve the email address.

Access module 116 adds the retrieved data element (including the data element value) to a result of the request at operation 315. Access module 116 and verification module 120 of server system 110 may be in the form of an application programming interface (API) as described above, where the result may be in the form of a payload of the API. The payload may include a descriptor for the data element and a corresponding value (e.g., as shown, by way of example, in FIG. 7).

Access module 116 may identify a corresponding data source (e.g., blockchain, off-chain data sources, etc.) for a data element based on the data source accessed for retrieval of the data element. For example, the access module may maintain a listing of data source identifiers and corresponding types of data sources (e.g., blockchain, off-chain data source, etc.), and use the listing to identify the corresponding data source. When the data element is not retrieved from a blockchain as determined at operation 320, verification module 120 of server system 110 may modify the data element information of the result to indicate that the data element was obtained from a data source other than a blockchain. The modification of the data element information may be pre-configured and performed based on parameters, or performed based on information indicated in the request.

When the data element information is to be modified as determined at operation 325 (e.g., based on the parameters or information in the request), verification module 120 modifies the data element information of the result to indicate that the data element was not retrieved from a blockchain at operation 330. For example, the data element information may be modified to include fields for blockchain attributes. A lack of blockchain data (or a non-blockchain data item) is indicated by providing an empty (or NULL) or other particular value for the verification proof and/or other blockchain attributes, preferably when a verification proof is expected for all data values (e.g., based on the parameters or information in the request). In addition, the data element information may include a message as a verification proof and/or other blockchain attribute indicating a lack of blockchain data (e.g., "Not read from the blockchain", etc.).

The indication of a non-blockchain data item for a data element may indicate a level of trustworthiness of the data element. For example, the data element may include a crypto or wallet address. This information may be stored on a blockchain or an off-chain data source (e.g., database, etc.). Since information from the off-chain data source tends to be less trustworthy than verifiable information from a blockchain, the indication for the crypto or wallet address as being a non-blockchain item indicates that the data element is from an off-chain data source and may be less trustworthy (relative to a data element from a blockchain).

When the data element information is not to be modified as determined at operation 325 (e.g., based on the parameters or information in the request), the data element information including the requested data element value remains in the result without further changes (or without an indication of an absence of blockchain data).

When the data element is obtained from the blockchain as determined at operation 320, verification module 120 generates a verification proof for the data element at operation 335. The verification proof may be any proof utilizing blockchain attributes to verify the data element obtained from the blockchain (e.g., a hierarchy of values derived from data of a block of a blockchain, etc.). For example, a verification proof based on a Merkle root or Merkle tree may be utilized to validate the data element obtained from the blockchain. A Merkle root enables a mathematical verification of data (from a block of a blockchain) on a Merkle tree. Merkle roots are typically used in cryptocurrency to ensure data blocks passed between peers on a peer-to-peer network are whole, undamaged, and unaltered. A Merkle root represents a hash of all hashes of all transactions of a block in a blockchain (arranged as a hierarchy of hash values on a Merkle tree), and is used for verification of blockchain data.

Figure 4:
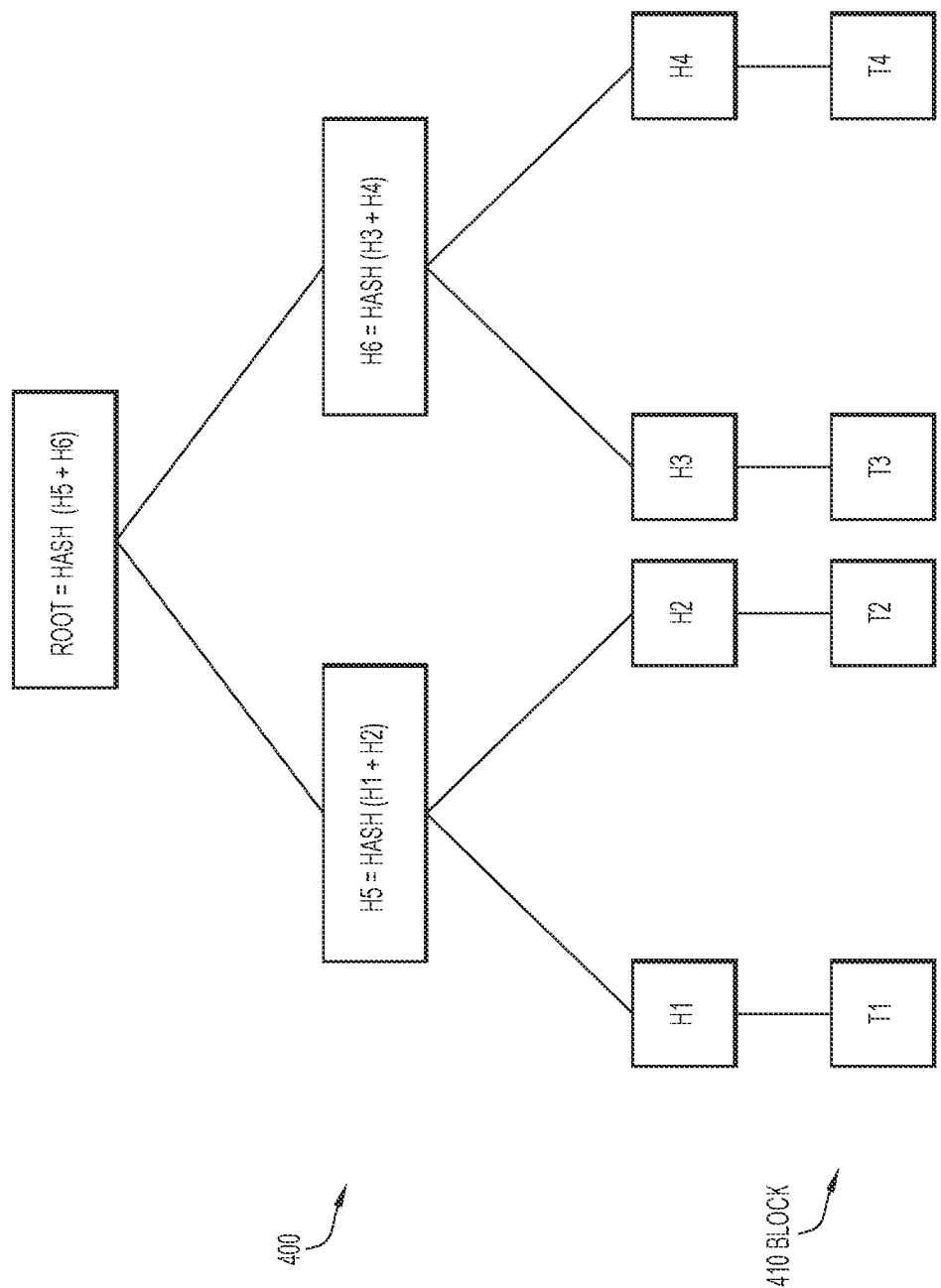
FIG. 4 is a diagrammatic illustration of an example verification tree employed by an embodiment of the present invention for verifying blockchain data.

Referring to FIG. 4, an example Merkle tree 400 represents a block 410 of a blockchain. Block 410 includes transactions T1, T2, T3, and T4. A hash or other encoding function is applied to each transaction to produce hash or encoded values of the transactions H1, H2, H3, and H4. An intermediate node of Merkle tree 400 represents a hash or encoded value H5 calculated by applying a hash or other encoding function to the combined (or summed) hash or encoded values H1, H2 for adjacent transactions T1, T2 (e.g., H5=HASH (H1+H2)). Similarly, another intermediate node of Merkle tree 400 represents a hash or encoded value H6 calculated by applying a hash or other encoding function to the combined (or summed) hash or encoded values H3, H4 for adjacent transactions T3, T4 (e.g., H6=HASH (H3+H4)). The Merkle root is calculated by applying a hash or other encoding function to the combined (or summed) hash or encoded values H5, H6 (e.g., ROOT=HASH (H5+H6)).

The Merkle tree is used to verify that no transaction in a block has been corrupted. For example, a change to transaction T1 would alter the corresponding hash or encoded value H1 and any subsequent hash or encoded values derived from H1, including H5 and the Merkle root. A change to the Merkle root indicates one or more corrupted transactions.

The Merkle root enables verification of data without having to download an entire block from a blockchain. The verification of data may be accomplished by using corresponding values of the Merkle tree. For example, in order to verify data of transaction T1, the values of the Merkle root, H2 and H6 would be needed from the Merkle tree. In this case, the hash or encoded values H1 (e.g., H1=HASH (T1)), H5 (e.g., H5=HASH (H1+H2)), and the Merkle root (e.g., ROOT=HASH (H5+H6)) are determined based on the data of transaction T1 and the values H2 and H6 from the Merkle tree. The data of transaction T1 is verified when the determined Merkle root matches the Merkle root of the Merkle tree.

Referring back to FIG. 3, the generated verification proof includes values used for verifying the data element, and may be generated based on values obtained from blockchain system 140. For example, the verification proof may include corresponding values of the Merkle root and Merkle tree for the block of the blockchain containing the data element. These values may be used to verify the data element in substantially the same manner described above (e.g., FIG. 4). The verification proof may alternatively be obtained from a third-party service (e.g., of a system 130). The data element information of the result is modified by verification module 120 to include blockchain attributes to validate the data element at operation 340. The blockchain attributes may include any attributes of the blockchain. For example, the blockchain attributes may include the verification (or Merkle) proof, block number of the latest block in the blockchain from which the data element was retrieved, chain identification (e.g., prevents a transaction of a chain from being in another chain, and used for signing transactions and verifying transaction signatures), the blockchain from which the data element was retrieved, and the state root (e.g., a root of a Merkle tree that stores an entire state of a system).

The data element information of the result may be modified to include the blockchain attributes for the data element at a time of retrieval of the data element from the blockchain. In the case of access module 116 and verification module 120 forming an application programming interface (API), the API payload may add the blockchain attributes via a new class method or process (e.g., verification module 120, etc.) that appends the blockchain attributes to the data element information of the payload.

Once the data element is processed (e.g., at operations 325, 330, and/or 340), a next data element for the request is retrieved at operation 310 and processed as described above until data elements satisfying the request have been retrieved as determined at operation 345. Once retrieval of data elements for the request is complete, the result including the requested data elements and blockchain attributes for blockchain data is returned by access module 116 to the requesting entity at operation 350. The verification module and/or requesting entity may use the blockchain attributes and rapidly verify the blockchain data based on fewer values (e.g., in substantially the same manner described above for FIG. 4). The blockchain attributes for blockchain data may further be saved by verification module 120 (e.g., in database system 118) and/or by the requesting entity for rapid verification of the blockchain data at a later point in time (e.g., during a reduced processing load, etc.).

Thus, when the result includes plural data elements from blockchain accesses, each set of blockchain attributes used for a corresponding blockchain data element may be appended to the corresponding data element information in the result. When the result includes a single data element from the blockchain, the blockchain attributes may include blockchain attributes for the block from which the data element was retrieved (as opposed to being limited to attributes of the data element) (e.g., entire Merkle tree for the block, attributes for the block, etc.).

Figure 5:
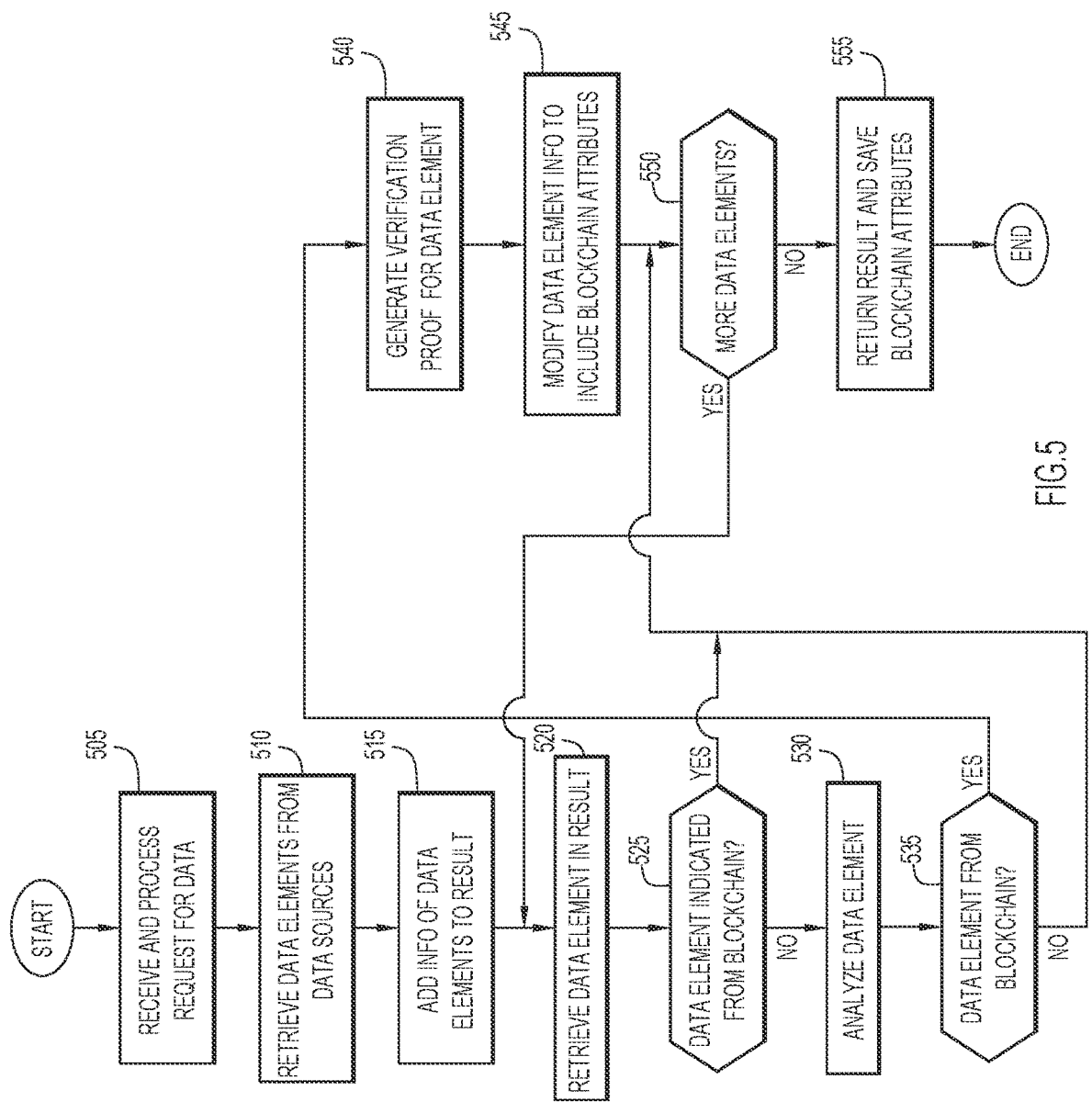
FIG. 5 is flowchart of a method of identifying blockchain data within accessed data and providing proof of verification for the blockchain data according to an embodiment of the present invention.

A method of identifying blockchain data within accessed data and providing proof of verification (e.g., via access module 116, verification module 120, blockchain system 140, and server system 110 and/or client system 114) according to an embodiment of the present invention is illustrated in FIG. 5. Initially, a request for data is received and processed by access module 116 of server system 110 at operation 505. The request may be from a user of client system 114, an application, or a network or other service (e.g., service provider system 130, etc.). The request includes a query or other indication of desired data to retrieve (e.g., search criteria, attributes, etc.), and may indicate data sources containing the requested data (e.g., particular blockchain, off-chain or other database, network or other site or service, etc.). The request may identify a block of a blockchain to retrieve data (e.g., a block number or hash value of a block of a blockchain when interested in a state of the blockchain that is not the latest or most recent state). In other words, the request may indicate a state of the blockchain for a previous point in time for retrieving data (e.g., based on the block number or hash value of a block, etc.). For example, the request may be in the form of a call (with corresponding parameters for data retrieval) to an application programing interface (API) containing access module 116 and verification module 120.

The request is processed by access module 116, and one or more data elements satisfying the request are retrieved from corresponding data sources at operation 510 in substantially the same manner described above. The data sources may include blockchain 142, a database, a network site, and/or any other available data source as described above.

Access module 116 adds information for the retrieved data elements to a result of the request at operation 515. The information may include values for the data elements, blockchain attributes for data elements obtained from the blockchain, and indications of non-blockchain items for data elements not obtained from the blockchain in substantially the same manner described above. Access module 116 and verification module 120 may be in the form of an application programming interface (API) as described above, where the result may be in the form of a payload of the API. The payload may include descriptors for the data elements and corresponding values (e.g., as shown, by way of example, in FIG. 7).

The result with the requested data may be analyzed prior to transmission to the requesting entity to ensure blockchain data has been properly identified. For example, an identification or identifier associated with a blockchain access (or pull operation) may not be recognized, and the corresponding data element may be identified as not being obtained from the blockchain. In this case, verification information may not be provided for a data element that is actually obtained from the blockchain.

Accordingly, verification module 120 of server system 110 analyzes data elements of the result prior to transmission to the requesting entity to ensure proper identification of blockchain data elements. Initially, the verification module retrieves a data element from the result to determine a data source indicated for the data element in the result at operation 520. When the data element in the result is categorized as not being from the blockchain (e.g., no blockchain attributes, an indication of a non-blockchain item, etc.) as determined at operation 525, verification module 120 analyzes the data element to determine a presence of blockchain data in the data element at operation 530. The presence of blockchain data in the data element may be determined by identifying a hash value in the data element (e.g., a public key (e.g., 256 bits), a wallet address (e.g., 160 bits), etc.), and/or a location of decentralized storage maintained on a blockchain (e.g., Interplanetary File System (IPFS), etc.). However, any other values indicative of data from a blockchain may be identified in the data element to determine that the data element is obtained from the blockchain.

When the data element is obtained from the blockchain as determined at operation 535, verification module 120 generates a verification proof for the data element obtained from the blockchain at operation 540. The verification proof may be any proof utilizing blockchain attributes to verify the data element. The generated verification proof includes values used for verifying the data element, and may be generated based on values obtained from blockchain system 140 or a third-party service in substantially the same manner described above. For example, the verification proof may include corresponding values of the Merkle root and Merkle tree for the block of the blockchain containing the data element. These values may be used to verify the data element in substantially the same manner described above (e.g., FIG. 4).

The data element information of the result is modified by verification module 120 to include blockchain attributes to validate the data element at operation 545. The blockchain attributes may include any attributes of the blockchain. For example, the blockchain attributes may include the verification (or Merkle) proof, block number of the latest block in the blockchain from which the data element was retrieved, chain identification (e.g., prevents a transaction of a chain from being in another chain, and used for signing transactions and verifying transaction signatures), the blockchain from which the data element was retrieved, and the state root (e.g., a root of a Merkle tree that stores an entire state of a system).

In the case of access module 116 and verification module 120 forming an application programming interface (API), the API payload may add the blockchain attributes via a new class method or process (e.g., verification module 120, etc.) that appends the blockchain attributes to the data element information of the payload.

When the data element is indicated in the result as being from a blockchain as determined at operation 525, is determined by the analysis to not be from the blockchain as determined at operation 535, or has been processed at operation 545, a next data element of the result is retrieved at operation 520 and processed as described above until the data elements of the result have been processed as determined at operation 550. Once the data elements for the result have been processed, the result including the requested data elements and blockchain attributes for blockchain data is returned by access module 116 to the requesting entity at operation 555. The verification module and/or requesting entity may use the blockchain attributes and rapidly verify the blockchain data based on fewer values (e.g., in substantially the same manner described above for FIG. 4). The blockchain attributes for blockchain data may further be saved by verification module 120 (e.g., in database system 118) and/or by the requesting entity for rapid verification of the blockchain data at a later point in time (e.g., during a reduced processing load, etc.).

Thus, when the result includes plural data elements from blockchain accesses, each set of blockchain attributes used for a corresponding blockchain data element may be appended to the corresponding data element information in the result. When the result includes a single data element from the blockchain, the blockchain attributes may include blockchain attributes for the block from which the data element was retrieved (as opposed to being limited to attributes of the data element) (e.g., entire Merkle tree for the block, attributes for the block, etc.).

Figure 6:
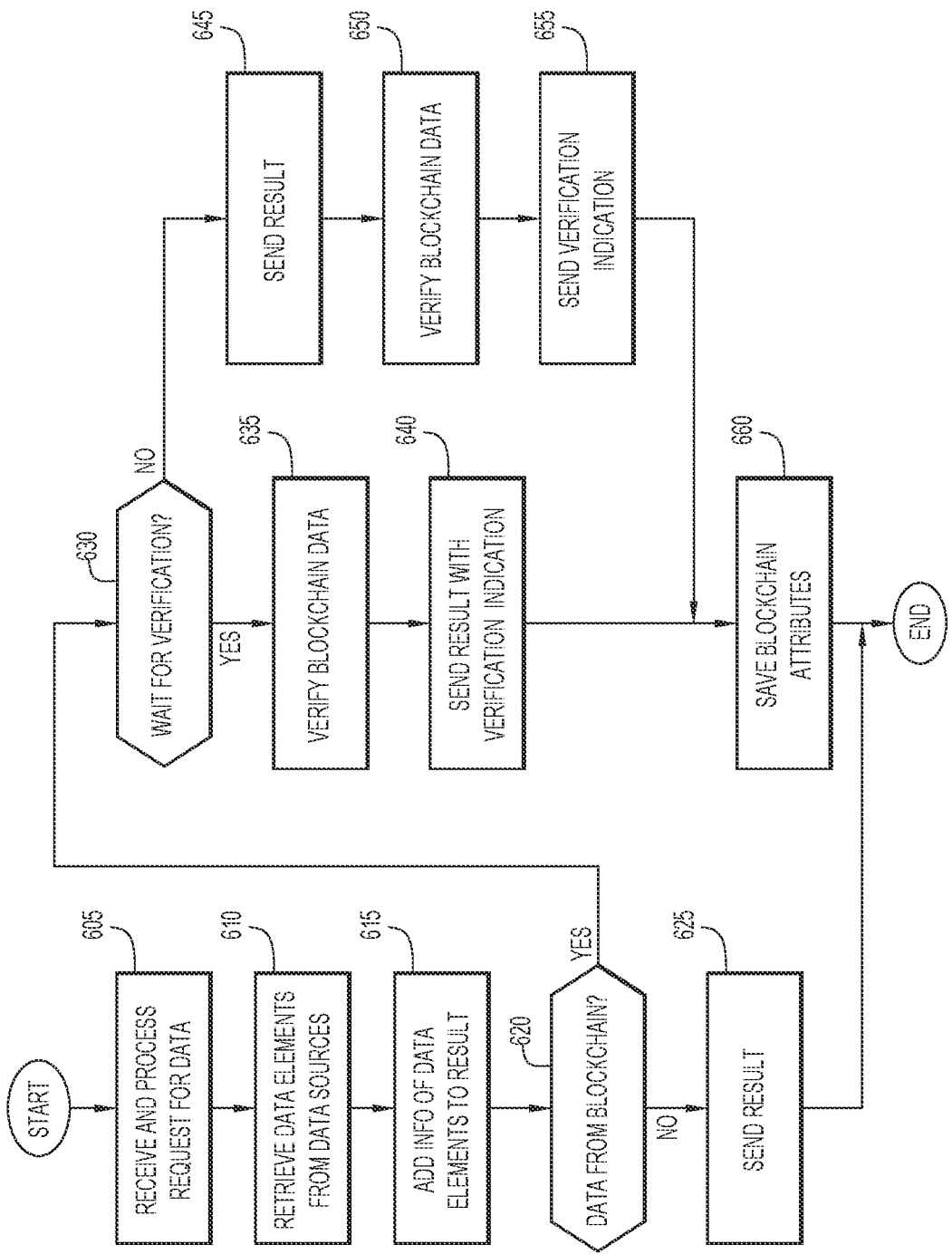
FIG. 6 is a flowchart of a method of accessing and verifying data on a blockchain according to an embodiment of the present invention.

A method of accessing and verifying data on a blockchain (e.g., via access module 116, verification module 120, blockchain system 140, and server system 110 and/or client system 114) according to an embodiment of the present invention is illustrated in FIG. 6. Initially, a request for data is received and processed by access module 116 of server system 110 at operation 605. The request may be from a user of client system 114, an application, or a network or other service (e.g., service provider system 130, etc.). The request includes a query or other indication of desired data to retrieve (e.g., search criteria, attributes, etc.), and may indicate data sources containing the requested data (e.g., particular blockchain, off-chain or other database, network or other site or service, etc.). The request may identify a block of a blockchain to retrieve data (e.g., a block number or hash value of a block of a blockchain when interested in a state of the blockchain that is not the latest or most recent state). In other words, the request may indicate a state of the blockchain for a previous point in time for retrieving data (e.g., based on the block number or hash value of a block, etc.). For example, the request may be in the form of a call (with corresponding parameters for data retrieval) to an application programing interface (API) containing access module 116 and verification module 120.

The request is processed by access module 116, and one or more data elements satisfying the request is retrieved from corresponding data sources at operation 610 in substantially the same manner described above. The data sources may include blockchain 142, a database, a network site, and/or any other available data source as described above.

Access module 116 adds information of the retrieved data elements (including values of the data elements) to a result of the request at operation 615. Access module 116 and verification module 120 may be in the form of an application programming interface (API) as described above, where the result may be in the form of a payload of the API. The payload may include descriptors for the data elements and corresponding values (e.g., as shown, by way of example, in FIG. 7).

The result with the requested data may be analyzed by verification module 120 prior to transmission to the requesting entity to determine a presence of blockchain data at operation 620. For example, access module 116 may identify the data source of a data element during access and retrieval that may be used by the verification module to determine whether the data element was obtained from a blockchain as described above. Further, the data elements may be analyzed by verification module 120 for certain values indicating retrieval from a blockchain as described above.

When the data elements are not retrieved from a blockchain as determined at operation 620, access module 116 may send the result to the requesting entity at operation 625. In other words, the result may be sent immediately since no verification of blockchain data is needed.

When one or more data elements are retrieved from a blockchain as determined at operation 620, verification of the blockchain data is performed. The verification may be performed prior, or subsequent, transmission of the result to the requesting entity. This may be pre-configured with the verification being performed at a time according to parameters, or the verification may be performed at a time according to information indicated in the request. For example, a requester associated with a transaction involving an insignificant amount of currency (e.g., on the order of tens of dollars or less, etc.) likely desires to proceed rather than wait for a verification of the blockchain data, whereas a requester associated with a transaction involving a significant amount of currency (e.g., on the order of hundreds of thousands of dollars or more, etc.) likely desires to wait for the verification of the blockchain data.

In addition, the verification (e.g., including generation of a verification proof) may be performed at a later time when processing resources are abundant or readily available (e.g., a time with a reduced processing load, etc.). This provides a faster response time for generating the verification proof and performing the verification.

When the verification is to be performed at the time of the transaction as determined at operation 630 (e.g., based on the parameters or information in the request, etc.), verification module 120 of server system 110 facilitates verification of the blockchain data at operation 635. The verification module may generate and utilize a verification proof and other blockchain attributes for the data elements obtained from the blockchain to validate the blockchain data.

Alternatively, verification module 120 may employ a third-party service (of a service provider system 130) to perform the verification, and provides a verification result, the third-party service performing the verification, and/or blockchain attributes. The indication of the third-party service may provide a level of trustworthiness of a data element. For example, a third-party service performing the verification with greater trustworthiness provides a greater level of trust for a data element relative to a less trustworthy third-party service. A webhook may be used to listen for the verification from the third-party service. The webhook basically enables real-time data to be sent from one application to another in response to occurrence of a given event.

The verification by verification module 120 or the third-party service may employ any proof utilizing blockchain attributes to verify the blockchain data. The verification proof includes values used for verifying a block chain data element, and may be generated based on values obtained from blockchain system 140 in substantially the same manner described above. For example, the verification proof may include corresponding values of the Merkle root and Merkle tree for the block of the blockchain containing the data element. These values may be used to verify a data element in substantially the same manner described above (e.g., FIG. 4).

The data element information of the result is modified by verification module 120 to include an indication of the verification result, and access module 116 transmits the result to the requesting entity at operation 640. The indication notifies the requesting entity that a verification (e.g., Merkle root verification, etc.) was performed for the blockchain data. The data element information in the result may further be modified to include the third-party service and/or blockchain attributes. The blockchain attributes may include any attributes of the blockchain. For example, the blockchain attributes may include the verification (or Merkle) proof, block number of the latest block in the blockchain from which the data element was retrieved, chain identification (e.g., prevents a transaction of a chain from being in another chain, and used for signing transactions and verifying transaction signatures), the blockchain from which the data element was retrieved, and the state root (e.g., a root of a Merkle tree that stores an entire state of a system).

In the case of access module 116 and verification module 120 forming an application programming interface (API), the indication of the verification result, third-party service, and/or blockchain attributes may be provided in the payload for a corresponding data element from the blockchain. A verification icon may be displayed with a verified data element by the requesting entity and/or other applications or services to indicate the data element has been validated.

When the verification is to be performed at a later or future time (e.g., batch mode, time of reduced processing load, etc.) as determined at operation 630 (e.g., based on the parameters or information in the request, etc.), access module 116 transmits the result with the requested data (including unverified blockchain data) to the requesting entity at operation 645. This enables the requesting entity to immediately utilize the data without having to wait for a time consuming verification.

Verification module 120 facilitates verification of the blockchain data at operation 650 (e.g., at a designated time, immediately after sending the result, etc.). The verification module may generate and utilize a verification proof and blockchain attributes for the data elements obtained from the blockchain to validate the blockchain data as described above.

Alternatively, the verification module may employ a third-party service to perform the verification and provide a verification result, the third-party service performing the verification, and/or blockchain attributes as described above. A webhook may be used to listen for the verification from the third-party service. The webhook basically enables real-time data to be sent from one application to another in response to occurrence of a given event.

The verification by verification module 120 or the third-party service may employ any proof utilizing blockchain attributes to verify the blockchain data. The verification proof includes values used for verifying a block chain data element, and may be generated based on values obtained from blockchain system 140 in substantially the same manner described above. For example, the verification proof may include corresponding values of the Merkle root and Merkle tree for the block of the blockchain containing the data element. These values may be used to verify a data element in substantially the same manner described above (e.g., FIG. 4).

An indication of the verification result for the blockchain data is sent to the requesting entity by verification module 120 (separate from the previously sent requested data) at operation 655. The verification indication may indicate a corresponding data element from the blockchain to which the verification pertains. The indication notifies the requesting entity that a verification (e.g., Merkle root verification, etc.) was performed for the blockchain data. The indication of the verification result may further include the third-party service and/or blockchain attributes. The blockchain attributes may include any attributes of the blockchain. For example, the blockchain attributes may include the verification (or Merkle) proof, block number of the latest block in the blockchain from which the data element was retrieved, chain identification (e.g., prevents a transaction of a chain from being in another chain, and used for signing transactions and verifying transaction signatures), the blockchain from which the data element was retrieved, and the state root (e.g., a root of a Merkle tree that stores an entire state of a system).

In the case of access module 116 and verification module 120 forming an application programming interface (API), the verification indication may be provided in a payload and indicate a corresponding data element from the blockchain to which the verification pertains. A verification icon may be displayed with a verified data element by the requesting entity and/or other applications or services to indicate the data element has been validated.

Once the data elements are processed (e.g., at operations 640 or 655), the blockchain attributes for blockchain data may be saved by verification module 120 (e.g., in database system 118) and/or by the requesting entity at operation 660 for rapid verification of the blockchain data at a later point in time (e.g., during a reduced processing load, etc.).

In addition, an integrated development environment (IDE) may be used to incorporate verification of blockchain data elements for data requests. In this case, the IDE may examine source code and identify any blockchain specific packages and function calls within the source code. When a blockchain related item is identified in the source code, a result of the item may be modified by the IDE to include blockchain attributes. Further, the IDE may prompt a user or developer with an error message when blockchain attributes are not included in a result. For example, the IDE may prompt a user or developer with respect to including the blockchain attributes (including a proof of verification) (e.g., to include or omit the blockchain attributes, etc.). In addition, an identified representational state transfer (REST) function call may be modified to attach a new class method or process (e.g., verification module 120, etc.) to provide the blockchain attributes as described above. The blockchain attributes may include substantially the same blockchain attributes described above.

An example scenario for requesting information with proof of verification of blockchain data is illustrated with respect to FIG. 7. Initially, a user may employ an application programming interface (API) to request a wallet address for a specific domain name (e.g., a non-fungible token (NFT) or other domain name, etc.). A result of the request is in the form of a payload with data accessed from a blockchain. An initial result may be in the form of a result or payload 700 including data element information 710 for a data element obtained from the blockchain (e.g., indicating the requested wallet address, etc.). The data element information may include a descriptor of the information and a corresponding value (e.g., descriptor of "value" with corresponding value as shown, by way of example, in FIG. 7).

Liability may arise for financial related or other transactions performed with corrupted data. However, generating a proof to verify a value from the blockchain returned by the application programming interface (API) can be time consuming and endure for as long as a few minutes, whereas merely trusting a value from the blockchain returned from the API may be performed on the order of milliseconds. Accordingly, an embodiment of the present invention appends blockchain attributes 720 including a verification proof (e.g., Merkle proof, etc.) to the result or payload for blockchain data. The blockchain attributes may be provided in a metadata section 730 of the result or payload that includes a descriptor of the attribute and a corresponding value (e.g., descriptors of "chainId", "blockchain", "blockNumber", "blockHash", "block", "owner", "value", and "proof" with corresponding values as shown, by way of example, in FIG. 7). The blockchain attributes may include a chain identification, a blockchain from which requested data is retrieved, a block number, a hash of the block, a state root of the block, a wallet address or other identifier of an owner for a transaction, and a verification proof (e.g., Merkle proof, etc.). The verification proof may additionally be placed outside of the metadata section and in proximity of the requested data (e.g., wallet address, etc.) in the result. The blockchain attributes may be used to validate the blockchain data in substantially the same manner described above.

Alternatively, the application programming interface (API) may perform the verification of a data element obtained from the blockchain based on the blockchain attributes (or use a third-party service to perform the verification), and provide the result of the verification (and the third-party service performing the verification) in metadata section 730 of the payload in substantially the same manner described above. The API may optionally provide the blockchain attributes in the payload in substantially the same manner described above.

Present invention embodiments may provide various technical and other advantages. For example, present invention embodiments enable rapid response times for data requests while providing trusted information for data consumers. For example, verification information provided with requested data may be used to quickly validate the requested data based on a few values without having to wait for extended times or downloading significant information from a blockchain to perform a verification. This improves response times and conserves computing resources.

Further, present invention embodiments provide enhanced data security for operations or transactions. The verification information ensures data security and integrity for the operations to prevent performance of the operations with corrupted data. This avoids unnecessary processing with corrupted data and repeat processing with valid data, thereby conserving computing and memory resources. Moreover, present invention embodiments may rely on the verification information (or prior verification) for subsequent requests for the same data, thereby avoiding significant amounts of processing, conserving processing and memory resources, and providing rapid responses. In addition, the verification may be deferred in order to provide an immediate response to a data request, and may be performed at a later time when processing resources are abundant or readily available (e.g., a time with a reduced processing load, etc.). This provides a faster response time for generating verification proofs and performing the verification.

It will be appreciated that the embodiments described above and illustrated in the drawings represent only a few of the many ways of implementing embodiments for accessing data on a blockchain with proof of data verification. In addition, characteristics or features of embodiments of the present invention may be combined in any fashion to provide additional embodiments of the present invention.

The environment of the present invention embodiments may include any number of computer or other processing systems (e.g., client or end-user systems, server systems, service provider systems, blockchain systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, hand-held devices, smartphones or other mobile devices, etc.), and may include any commercially available operating system and any combination of commercially available and custom software (e.g., communications software; server software; software of present invention embodiments (including access module 116, verification module 120, interface module 122, etc.), etc.). These systems may include any types of monitors and input devices (e.g., keyboard, mouse, voice recognition, etc.) to enter and/or view information.

It is to be understood that the software of the present invention embodiments (e.g., access module 116, verification module 120, interface module 122, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, server, service provider, and blockchain systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., access module 116, verification module 120, interface module 122, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium. The computer useable or readable medium (or media) may include instructions executable by one or more processors to perform functions of present invention embodiments described herein.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., responses to the data requests, verification proofs, blockchain attributes, etc.). The database system may be implemented by any number of any conventional or other databases, data stores or storage structures to store information. The database system may be included within or coupled to the server, client, service provider, and/or blockchain systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., results of the data request, verification proof, verification results, blockchain attributes, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., results of the data request, verification proof, verification results, blockchain attributes, etc.).

The present invention embodiments are not limited to the specific tasks or algorithms described above, but may be utilized for verifying data from a blockchain or other data source.

The present invention embodiments may process requests from any entity (e.g., user, application, service, computing or other device, etc.), and retrieve any data (e.g., attributes, values, etc.) from any quantity of any type of data sources (e.g., blockchain, off-chain or on-chain database, a network site, decentralized storage platform, etc.). The request may include any type of query or other indication of any desired data to retrieve (e.g., search criteria, attributes, etc.), and may indicate any data sources containing the requested data (e.g., particular blockchain, off-chain or other database, network or other site or service, etc.). The data sources to access for requested data may be determined in any manner (e.g., indicated in the request, listing of data sources and corresponding stored data, identifiers retrieved from a blockchain or other data source, etc.). The request may further include any parameters indicating a time for verification (e.g., at a time of providing results, at a later time, etc.). The present invention embodiments may be in any form (e.g., software/hardware modules, software packages, application programming interfaces (APIs), procedures, routines, functions, etc.), and may provide a result or payload of any format or structure.

The verification information may include any information pertaining to verification of a blockchain data element (e.g., attributes of a block or blockchain, proof of verification or validation, verification or validation results, etc.). The verification proof may include any proof demonstrating validation of the blockchain data, and any desired data (e.g., Merkle or other values, attributes of block and/or blockchain, etc.).

Blockchain data may be identified based on any desired values or attributes (e.g., type of data source accessed, certain values or type of data (e.g., hash or encoded value, storage location pertaining to a blockchain, etc.), etc.). The integrated development environment (IDE) may include any type of conventional or other development environment, and may analyze any type of software code or results to determine presence of verification information for blockchain data.

The verification and/or generation of verification information may be performed at any desired time (e.g., at time of an access of a blockchain, a future time, etc.). The results may be provided without the verification information, while the verification and corresponding results may be provided at a later time (e.g., during a reduced processing load, etc.). The verification information may be saved to enable the verification to be performed at a later time (e.g., enabling immediate use of resulting data, etc.). The verification information or results may be used to quickly verify blockchain data based on a previous verification (e.g., without having to repeat the verification, etc.).

Having described preferred embodiments of a new and improved system, method, and computer program product for accessing data on a blockchain with proof of data verification, it is believed that other modifications, variations and changes will be suggested to those skilled in the art in view of the teachings set forth herein. It is therefore to be understood that all such variations, modifications and changes are believed to fall within the scope of present invention embodiments as defined by the appended claims.

What is claimed is:

1. A method of accessing data on a blockchain comprising:
   accessing, via at least one processor including an application programming interface, one or more data sources to retrieve one or more data elements satisfying a data request in a call to the application programming interface from an entity, wherein the one or more data elements include at least one blockchain data element retrieved from a corresponding blockchain and the data request indicates deferred verification of the at least one blockchain data element to use the at least one blockchain data element for a transaction prior to verification of the at least one blockchain data element against the corresponding blockchain;
   producing, via the at least one processor, verification information for each blockchain data element that is used to validate the blockchain data element against values derived from data of a block of the corresponding blockchain containing the blockchain data element; and
   sending to the entity, via the at least one processor, a result for the data request prior to verification of the at least one blockchain data element against the corresponding blockchain according to the data request, wherein the result includes a payload of the application programming interface with the one or more data elements and the verification information for each blockchain data element used for determining validity of that blockchain data element with respect to corruption of the data of the block of the corresponding blockchain.

2. The method of claim 1, further comprising:
   generating, via the at least one processor, the result for the data request including the one or more data elements; and
   modifying, via the at least one processor, the result to include the verification information for each blockchain data element, wherein the verification information includes blockchain attributes comprising a proof of verification of a corresponding blockchain data element.

3. The method of claim 2, wherein the one or more data elements include a plurality of data elements with a data element not retrieved from a blockchain, and the method further comprises:
   modifying, via the at least one processor, the result to indicate a non-blockchain data item for the data element not retrieved from a blockchain.

4. The method of claim 1, wherein sending to the entity further comprises:
   sending the one or more data elements to the entity prior to sending the payload with the verification information.

5. The method of claim 1, further comprising:
   identifying, via the at least one processor, the at least one blockchain data element retrieved from the corresponding blockchain from among the one or more data elements based on the at least one blockchain data element including one of a hash value and a storage location for a de-centralized storage platform.

6. The method of claim 1, further comprising:
   validating each blockchain data element against the block of the corresponding blockchain containing that blockchain data element based on the verification information in the payload after sending the result.

7. A system for accessing data on a blockchain comprising:
   one or more memories; and
   at least one processor coupled to the one or more memories and including an application programming interface, the at least one processor configured to:
     access one or more data sources to retrieve one or more data elements satisfying a data request in a call to the application programming interface from an entity, wherein the one or more data elements include at least one blockchain data element retrieved from a corresponding blockchain and the data request indicates deferred verification of the at least one blockchain data element to use the at least one blockchain data element for a transaction prior to verification of the at least one blockchain data element against the corresponding blockchain;
     produce verification information for each blockchain data element that is used to validate the blockchain data element against values derived from data of a block of the corresponding blockchain containing the blockchain data element; and
     send to the entity a result for the data request prior to verification of the at least one blockchain data element against the corresponding blockchain according to the data request, wherein the result includes a payload of the application programming interface with the one or more data elements and the verification information for each blockchain data element used for determining validity of that blockchain data element with respect to corruption of the data of the block of the corresponding blockchain.

8. The system of claim 7, wherein the at least one processor is further configured to:
   generate the result for the data request including the one or more data elements; and
   modify the result to include the verification information for each blockchain data element, wherein the verification information includes blockchain attributes comprising a proof of verification of a corresponding blockchain data element.

9. The system of claim 8, wherein the one or more data elements include a plurality of data elements with a data element not retrieved from a blockchain, and the at least one processor is further configured to:
   modify the result to indicate a non-blockchain data item for the data element not retrieved from a blockchain.

10. The system of claim 7, wherein sending to the entity further comprises:
    sending the one or more data elements to the entity prior to sending the payload with the verification information.

11. The system of claim 7, wherein the at least one processor is further configured to:
    identify the at least one blockchain data element retrieved from the corresponding blockchain from among the one or more data elements based on the at least one blockchain data element including one of a hash value and a storage location for a de-centralized storage platform.

12. The system of claim 7, wherein the at least one processor is further configured to:
    validate each blockchain data element against the block of the corresponding blockchain containing that blockchain data element based on the verification information in the payload after sending the result.

13. A computer program product for accessing data on a blockchain, the computer program product comprising one or more non-transitory computer readable media having instructions stored thereon, the instructions executable by at least one processor including an application programming interface to cause the at least one processor to:

access one or more data sources to retrieve one or more data elements satisfying a data request in a call to the application programming interface from an entity, wherein the one or more data elements include at least one blockchain data element retrieved from a corresponding blockchain and the data request indicates deferred verification of the at least one blockchain data element to use the at least one blockchain data element for a transaction prior to verification of the at least one blockchain data element against the corresponding blockchain;

produce verification information for each blockchain data element that is used to validate the blockchain data element against values derived from data of a block of the corresponding blockchain containing the blockchain data element; and send to the entity a result for the data request prior to verification of the at least one blockchain data element against the corresponding blockchain according to the data request, wherein the result includes a payload of the application programming interface with the one or more data elements and the verification information for each blockchain data element used for determining validity of that blockchain data element with respect to corruption of the data of the block of the corresponding blockchain.

14. The computer program product of claim 13, wherein the instructions executable by the at least one processor further cause the at least one processor to:

generate the result for the data request including the one or more data elements; and modify the result to include the verification information for each blockchain data element, wherein the verification information includes blockchain attributes comprising a proof of verification of a corresponding blockchain data element.

15. The computer program product of claim 14, wherein the one or more data elements include a plurality of data elements with a data element not retrieved from a blockchain, and wherein the instructions executable by the at least one processor further cause the at least one processor to:

modify the result to indicate a non-blockchain data item for the data element not retrieved from a blockchain.

16. The computer program product of claim 13, wherein sending to the entity further comprises:

sending the one or more data elements to the entity prior to sending the payload with the verification information.

17. The computer program product of claim 13, wherein the instructions executable by the at least one processor further cause the at least one processor to:

identify the at least one blockchain data element retrieved from the corresponding blockchain from among the one or more data elements based on the at least one blockchain data element including one of a hash value and a storage location for a de-centralized storage platform.

18. The computer program product of claim 13, wherein the instructions executable by the at least one processor further cause the at least one processor to:

validate each blockchain data element against the block of the corresponding blockchain containing that blockchain data element based on the verification information in the payload after sending the result.

\* \* \* \* \*